US006783412B1

(12) United States Patent
Wynveen et al.

(10) Patent No.: US 6,783,412 B1
(45) Date of Patent: Aug. 31, 2004

(54) COOLING WATER DISTRIBUTION SYSTEM FOR A MARINE PROPULSION DEVICE

(75) Inventors: Steve Wynveen, Germantown, WI (US); Stuart M. Halley, Brownsville, WI (US); Bernard E. Ritger, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/409,850

(22) Filed: Apr. 9, 2003

(51) Int. Cl.[7] .............................................. B63H 21/10
(52) U.S. Cl. ................................... 440/88 M; 440/88 T
(58) Field of Search ....................... 440/2, 88 C, 88 D, 440/88 G, 88 M, 88 T

(56) References Cited

U.S. PATENT DOCUMENTS

| 4,061,571 A | * | 12/1977 | Banner | ....................... 210/130 |
| 4,160,733 A | | 7/1979 | Nelson | ......................... 210/85 |
| 5,536,189 A | * | 7/1996 | Mineo | ....................... 440/89 R |
| 6,036,556 A | | 3/2000 | Baker et al. | ................... 440/38 |
| 2002/0170704 A1 | | 11/2002 | Jackson | ........................ 165/95 |

* cited by examiner

Primary Examiner—Stephen Avila
(74) Attorney, Agent, or Firm—William D. Lanyi

(57) ABSTRACT

A cooling water distribution system provides a single cavity from which water is directed to a plurality of auxiliary devices. The cavity is formed within a housing structure that has a perforate surface shaped to be inserted into a primary water conducting channel through which water flows from a water pump to an internal combustion engine. The perforate surface does not extend into the water stream induced by the water pump but, instead, is shaped to conform to an inner surface of the water conducting cavity. Holes in the perforate surface are shaped to allow water to flow from the main channel of the water conducting cavity into the cavity of the housing structure from which the water is distributed through a plurality of water conduits to various auxiliary devices requiring cooling water.

1 Claim, 5 Drawing Sheets

COOLING WATER DISTRIBUTION SYSTEM FOR A MARINE PROPULSION DEVICE

BACKGROUND OF THE INVENTION

1. Field of the Invention

The present invention is generally related to a cooling water distribution system for a marine propulsion device and, more particularly, to a manifold having a perforate surface shaped to conform to the inner surface of a primary cooling water conduit of an outboard motor.

2. Description of the Prior Art

The patents described above are hereby expressly incorporated by reference in the description of the present invention.

Marine propulsion devices typically utilize lake or sea water as a cooling liquid to remove heat from various heat producing components of an internal combustion engine. Some of the cooling water, induced to flow through a cooling system of the engine by a water pump, is diverted to accessory components or devices which allow the operability of the cooling system to be monitored. Since cooling water is drawn from a body of water in which a marine vessel is operated, debris can be drawn through the cooling conduits of the marine propulsion device. Therefore, various techniques are usually employed to avoid the blocking of small cooling channels with the debris.

U.S. Pat. No. 6,036,556, which issued to Baker et al on Mar. 14, 2000, describes an outboard motor with a bleed system for an engine cooling jacket. A jet propulsion unit comprises a housing including a wall defining a water tunnel having therein a water outlet port. It also comprises a recess located in the wall defining the tunnel and in surrounding relation to the port. It further comprises a screen located at the recess and extending across the port and in flush relation to the wall defining he tunnel.

U.S. Pat. No. 4,160,733, which issued to Nelson on Jul. 10, 1979, describes a marine engine cooling water filter cleaning system. The invention pertains to an engine installation using marine water as a coolant and having an intake conduit system for draining marine water to the engine including a strainer at the inlet and a filter between the strainer and the water pump. To clean the filter and strainer which periodically becomes clogged with foreign matter while the engine is operating, a valve mechanism is provided between the filter and the water pump which is operative to close the conduit to the pump and to admit compressed air to the filter side of the valve mechanism for a short time to blow back the clogging material from the filter and strainer to the sea. In a semi-automatic embodiment the valve mechanism is a solenoid operated 3-way valve which is preferably operated from the pilot house for a short interval of about 10 seconds when the boat operator observes an above normal engine temperature. In an automatic embodiment a heat sensor associated with the engine energizes the solenoid circuit when a predetermined above normal temperature is reached and a cycle timer in the circuit controls the solenoid operation through predetermine ON and OFF periods.

U.S. patent application Ser. No. 10/142,772, which was filed by Jackson on May 13, 2002, describes an installation for recovering debris stopped by a filter at the inlet of a heat exchanger. An installation for recovering debris stopped by a filter at the inlet of a heat exchanger comprises a washing water manifold at the outlet of the filter which feeds a separator provided with an outlet pipe for water free of debris to which is connected an ejector nozzle which is connected to the outlet pipe of the exchanger.

It would be significantly beneficial if a cooling water distribution system could be provided in which a single perforate surface can be used to prevent the flow of debris into a plurality of water conduits, in which each of the plurality of water conduits directs a portion of the cooling water flow to various auxiliary devices and/or regions of the internal combustion engine. It would also be significantly beneficial if the perforate surface can be shaped to conform to a primary coolant passage in order to minimize the adverse effects of debris and weeds flowing through the primary coolant passage while reducing the effect on the flow of water through the primary passage.

SUMMARY OF THE INVENTION

A cooling water distribution system for a marine propulsion device, made in accordance with the preferred embodiment of the present invention, comprises a housing structure, a cavity formed within the housing structure, and a perforate surface of the housing structure in which the perforate surface is shaped to be inserted into an opening formed in a water conducting cavity of the marine propulsion device. The present invention further comprises a first water conduit connected in fluid communication with the cavity and a second water conduit connected in fluid communication with the cavity.

The perforate surface comprises a plurality of holes in which each of the plurality of holes is smaller in dimension, such as diameter or area, then either of the first and second water conduits. The perforate surface is curved to generally conform with an inner surface of the water conducting cavity. The housing structure is shaped to dispose the perforate surface in a non-protruding position, in relation to an inner surface of the water conducting cavity, when the housing structure is attached to a portion of the marine propulsion device in which the water conducting cavity is contained and the perforate surface is disposed in fluid communication with the water conducting cavity.

The first water conduit is connectable to a fuel cooling system. The second water conduit is connectable to an exhaust cooling system. The present invention can further comprise a third water conduit that is connected in fluid communication with the cavity. The third water conduit is connectable to a tell-tale system. The perforate surface is a curved surface having a radius of curvature which is generally equal to a radius of curvature of an inside surface of the water conducting cavity surrounding the perforate surface.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
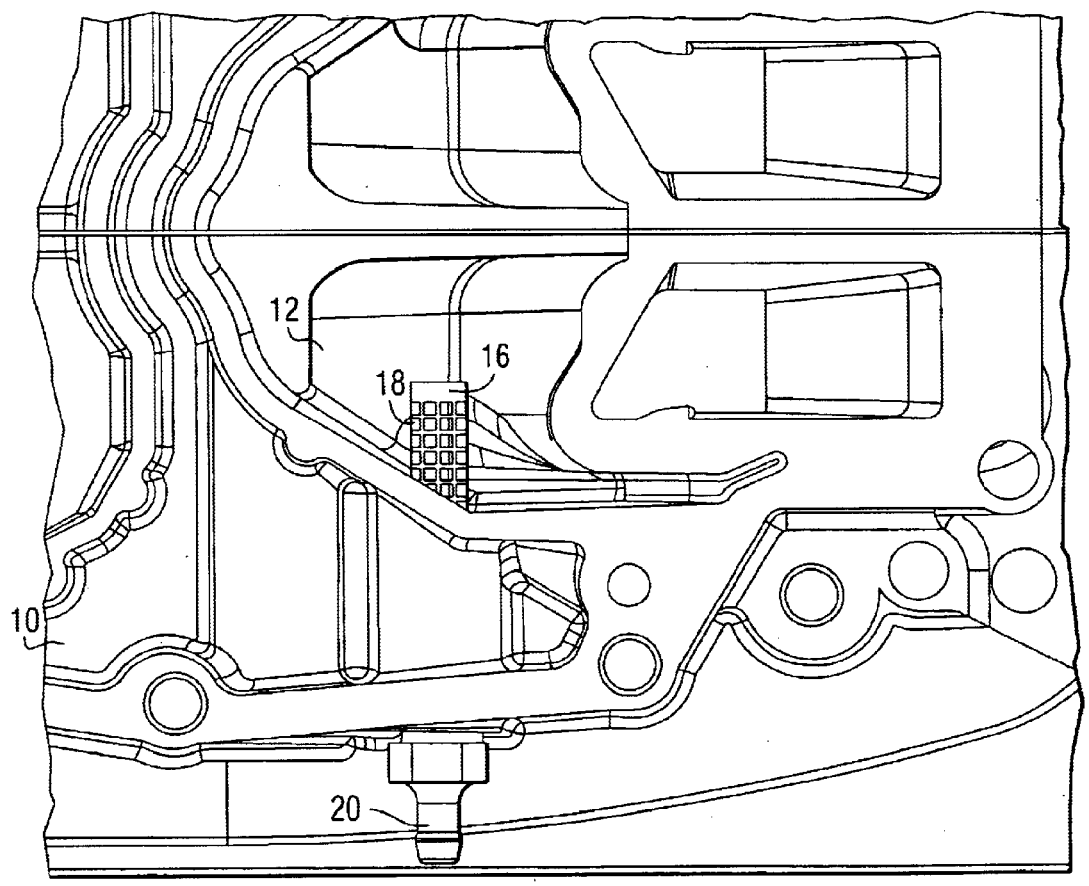
FIG. 1 shows a prior art cooling system with a screen disposed within a primary cooling water channel.

Throughout the description of the preferred embodiment of the present invention, like components will be identified by like reference numerals.

FIG. 1 shows a section view of an adaptor plate 10 of an outboard motor, having a water conducting cavity 12 formed therein. The purpose of the water conducting cavity 12 is to direct a stream of water from a water pump to various heat producing portions of an internal combustion engine. A screen member 16 is inserted into the water conducting cavity 12 to allow a portion of the water flowing through the water conducting cavity 12 to pass through openings 18 and flow through a water conduit 20 to an auxiliary device so that a portion of the cooling water can be provided to remove heat from that device. In systems such as that represented in FIG. 1, individual conduits 20 are provided with individual screens 16 that are each inserted into the water conducting cavity 12 to draw a portion of the water for use by an associated auxiliary or monitoring device, such as a tell-tale system. In some cooling systems, the water flowing through conduit 20 passes through a first auxiliary device, such as a fuel supply module, and then continues to flow serially to other devices, such as an exhaust cooling system or a tell-tale system. When the auxiliary devices are connected serially, each device adds heat to the cooling water and reduces the cooling effect on the downstream devices because of the increased temperature of the cooling water that flows to those devices.

Several inherent problems exist in systems such as that illustrated in FIG. 1. As discussed above, typically an individual screen 16 and conduit 20 are provided for each auxiliary device that requires cooling water. In addition, the screens 16 provide resistance to the smooth flow of water through the water conducting cavity 12. When a plurality of the screens 16 are used, this increased fluid resistance is exacerbated. Another inherent problem in systems of the type shown in FIG. 1 is that grasses, weeds, and certain other types of debris can become wrapped around the protruding screen 16 as the grasses are drawn by the water pump from a body of water and induced to flow toward the internal combustion engine. If grasses become wrapped around the screen member 16, clearing the passage can be difficult and may require disassembly.

Figure 2:
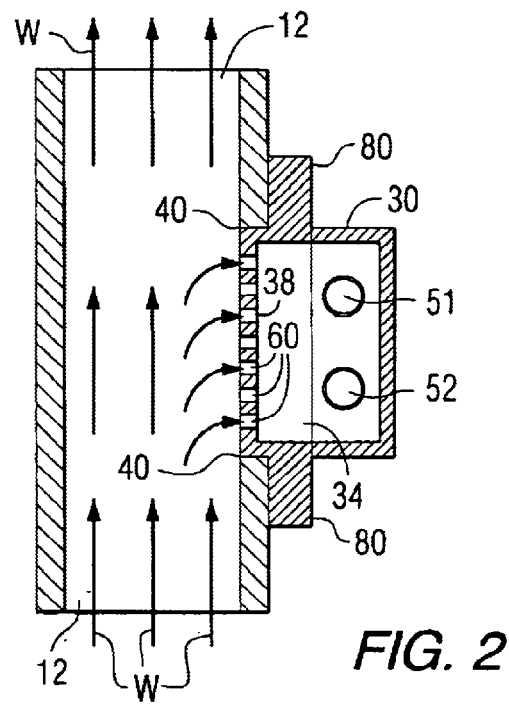
FIGS. 2 and 3 are highly simplified representations of the present invention.
Figure 3:
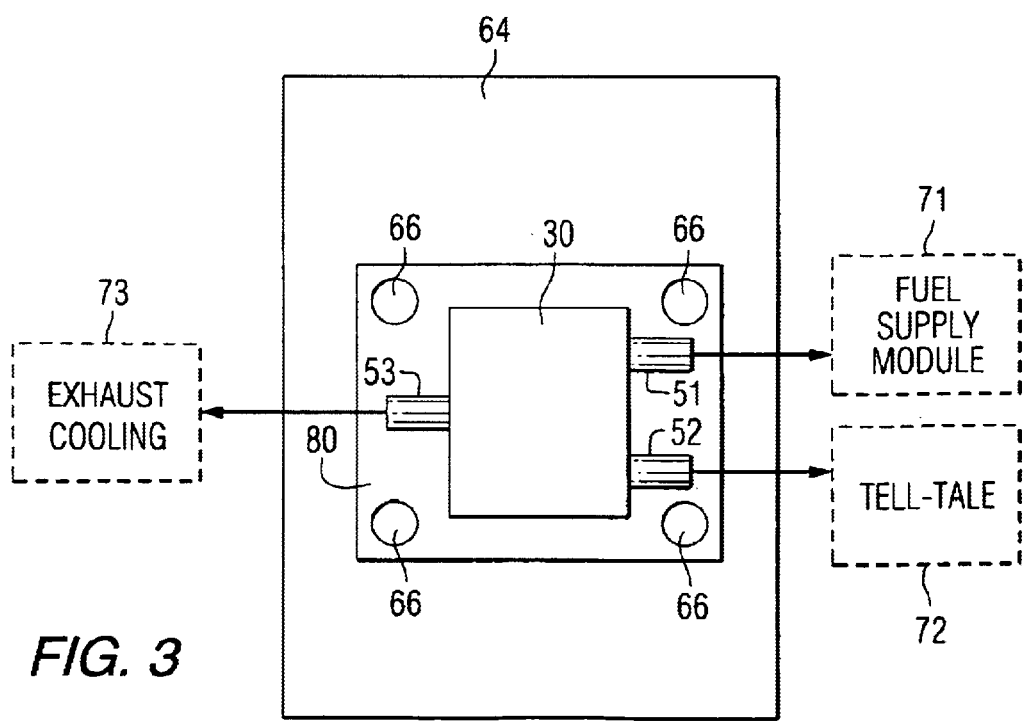

FIGS. 2 and 3 are highly simplified representations of the present invention used in conjunction with a water conducting cavity 12. A cooling water distribution system made in accordance with the preferred embodiment of the present invention comprises a housing structure 30 with a cavity 34 formed within it. A perforate surface 38 of the housing structure 30 is shaped to be inserted into an opening 40 formed in a water conducting cavity 12 of a marine propulsion device. A first water conduit 51 is connected in fluid communication with the cavity 34. A second water conduit 52 is also connected in fluid communication with the cavity 34.

The perforate surface 38 comprises a plurality of holes 60. Each of the plurality of holes 60 is smaller in dimension (e.g. either diameter or area) than either of the first and second water conduits, 51 and 52. As a result, any debris passing through the holes 60 will also pass through the first and second water conduits and the auxiliary device connected in fluid communication therewith.

FIG. 3 shows the housing structure 30 attached to an outer surface of a portion 64 of a marine propulsion device in which the water conducting cavity 12 is contained. When attached in this way, the perforate surface 38 is disposed in fluid communication with the water conducting cavity 12. Holes 66 are provided to facilitate the attachment of the housing structure 30 to the outer surface of the portion of 64 of the marine propulsion device that surrounds the water conducting cavity 12.

In FIG. 3, the first water conduit 51 is schematically shown connected in fluid communication with a fuel supply module 71, the second water conduit 52 is shown connected in fluid communication with a tell-tale device 72, and a third water conduit 53 is shown schematically connected in fluid communication with an exhaust cooling system 73. It should be understood that these connections can be interchanged in alternative arrangements of the present invention.

With continued reference to FIGS. 2 and 3, a portion of the water flowing through the water conducting cavity 12 is drawn through the plurality of holes 60 and flows into the cavity 34 which is surrounded by the housing structure 30. From the cavity 34, the water flows through the first 51, second 52, and third 53 water conduits to their respective auxiliary devices and/or systems.

Certain advantages of the present invention can be seen in FIGS. 2 and 3. For example, the perforate surface 38 does not protrude into the primary stream of water, represented by arrows W, flowing through the water conducting cavity 12. As a result, grasses and various other debris cannot wrap around any protruding component, such as that illustrated in the prior art system shown in FIG. 1. In addition, the non-protruding position of the perforate surface 38 does not obstruct or restrict the water flow through the water conducting cavity 12. In addition, a single perforate surface 38 supplies water to 3 different auxiliary components and/or systems in parallel streams. As a result, the number of individual manifolds and/or screen components needed to provide the cooling water distribution system is significantly reduced in comparison to the prior art systems.

Figure 4:
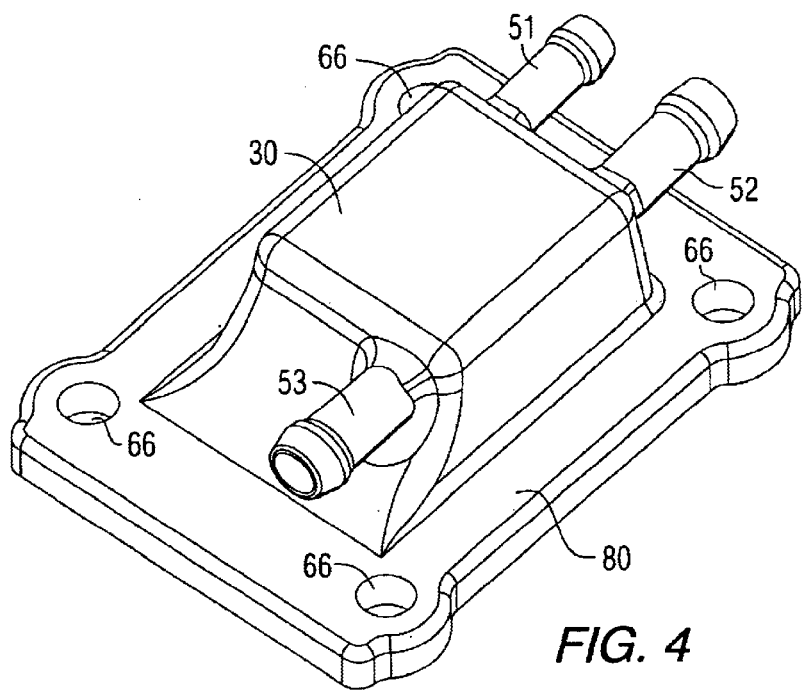
FIGS. 4 and 5 are isometric views of the housing structure of the present invention.

FIG. 4 is an isometric view of the outer portion of the present invention. The housing structure 30 contains the cavity 34 therein. A mounting plate portion 80 is provided with the holes 66 that allow the device to be mounted to the outer surface of a portion 64 of the marine propulsion device in which the water conducting cavity 12 is located.

Figure 5:
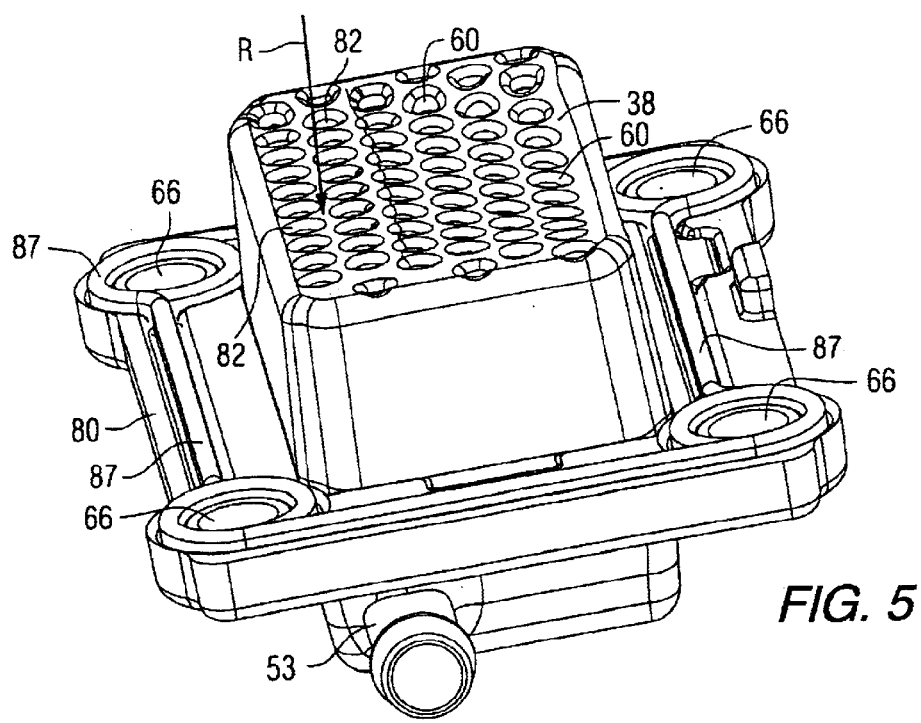

FIG. 5 shows the perforate surface 38 with the plurality of holes 60 formed therethrough. In a preferred embodiment of the present invention, each of the holes 60 is provided with a beveled surface 82 which further inhibits clogging of the holes 60 by debris. An elastomeric seal member 87 is provided to prevent water from leaking past the mounting plate 80 from the water conducting cavity 12. The elastomeric seal 87 extends along the sides of the mounting plate 80 and around each of the holes 66.

Figure 6:
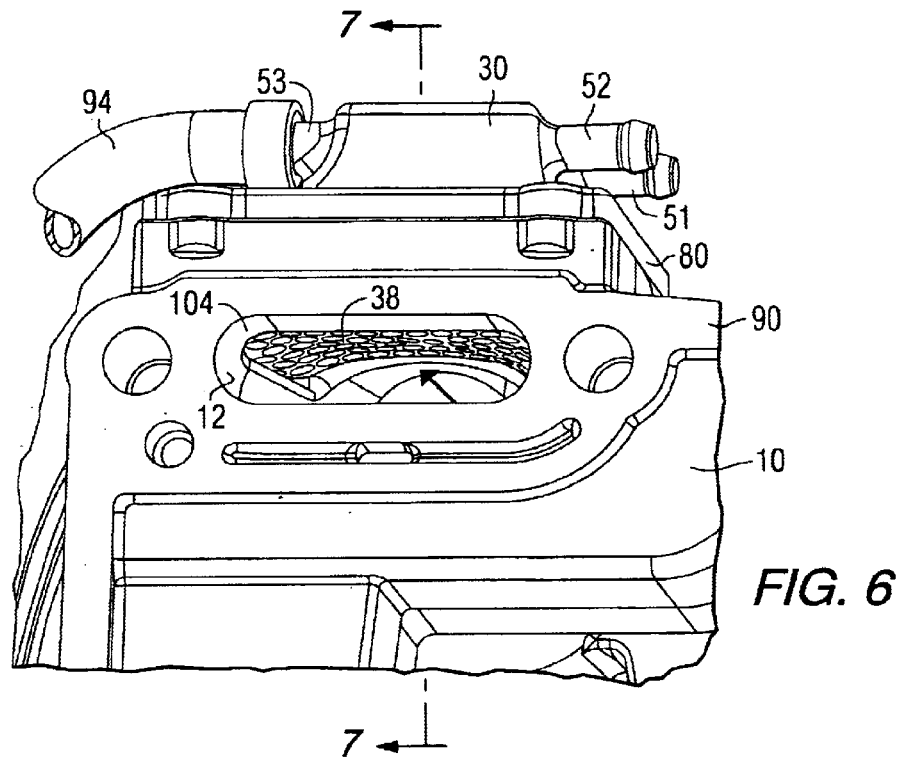
FIG. 6 is an isometric view of the present invention mounted to an adapter plate of an outboard motor.

FIG. 6 is a portion of an isometric view of an adapter plate 10 in which the present invention is used. The downstream end 104 of the water conducting cavity 12 is shown as being generally oblong at the surface 90 of the adapter plate 10, but it should be understood that the water conducting cavity 12 is generally ovate in the region of the perforate surface 38. The first 51, second 52, and third 53 water conduits are shown extending from the housing structure 30 in FIG. 6. The third water conduit 53 is shown with a flexible tube 94, or hose, attached to it to direct water from the cavity of the present invention to an exhaust cooling system 73 as described above in conjunction with FIG. 3.

Figure 7:
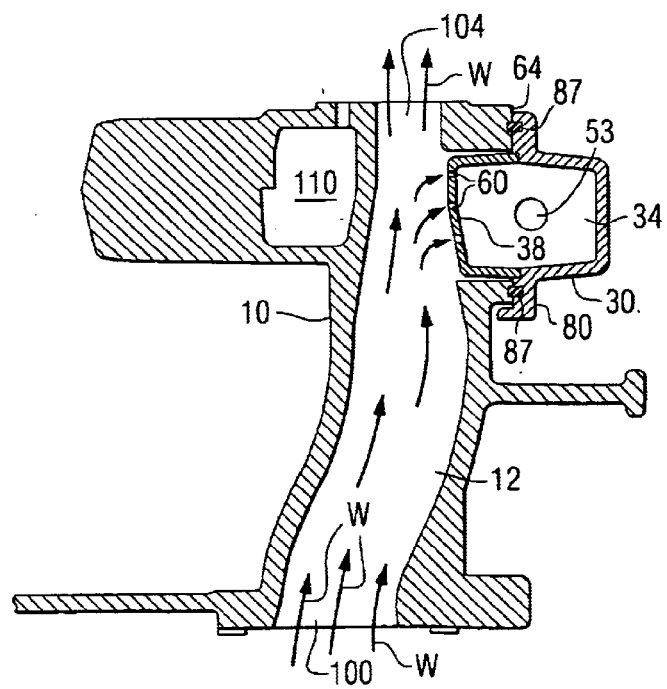
FIG. 7 is a section view of FIG. 6.

FIG. 7 is a section view of a portion of the system shown in FIG. 6. At the bottom, or upstream, portion 100 of the water conducting cavity 12, it is generally circular in shape.

It gradually changes to an ovate shape at the upper, or downstream, portion 104. The housing structure 30 is attached to an outer surface of a portion 64 of the marine propulsion device in which the water conducting cavity 12 is contained. Water is drawn from a body of water in which a marine vessel is operated and induced to flow upwardly through the water conducting cavity 12, as represented by arrows W. A portion of that water is induced to flow through the plurality of holes 60 of the perforate surface 38. In the section view of FIG. 7, the third water conduit 53 is illustrated. The water flowing through the plurality of holes 60 flows into the cavity 34 and is distributed through the first, second, and third water conduits. For purposes of reference, an exhaust cavity is identified by reference numeral 110 in FIG. 7.

Figure 8:
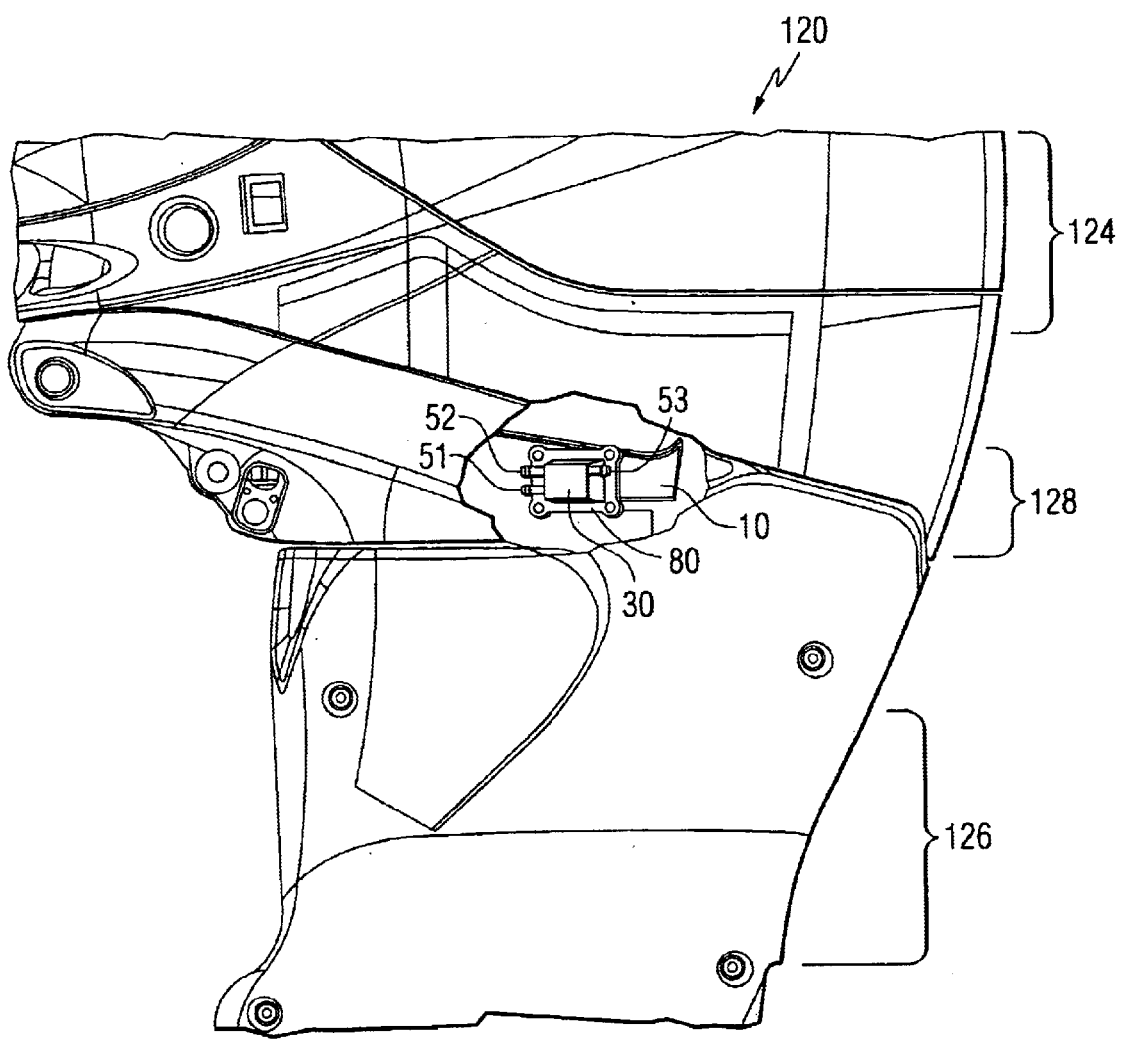
FIG. 8 is a side view of an outboard motor with a portion of the housing structure removed to show the location of the present invention.

FIG. 8 is a side view of a portion of an outboard motor 120 with a portion of its outer housing removed to illustrate the location of the present invention. As is well known to those skilled in the art, an outboard motor 120 comprises a cowl portion 124, a driveshaft housing portion 126, and an adapter plate portion 128. The general locations of these portions are identified in FIG. 8. Supported by the driveshaft housing portion 126 is a gear case and propeller shaft which is not shown in FIG. 8. In the torn away section of FIG. 8, the housing structure 30 and mounting plate portion 80 are shown in relation to an adapter plate 10 to which they are attached. The first 51, second 52, and third 53 water conduits are also identified in FIG. 8. The housing structure 30 and mounting plate 80 of the present invention are attached to the outer surface of the portion 64 in which the water conducting cavity 12 is contained. Water is induced to flow upwardly through the water conducting cavity as a result of a water pump that draws waters from a body of water in which the outboard motor 120 is operated and causes the water to flow upwardly toward the heat producing portions of the internal combustion engine which is contained under the cowl portion 124.

With reference to FIGS. 2–8, it can be seen that the present invention provides a cooling water distribution system for a marine propulsion device, such as an outboard motor 120, that comprises a housing structure 30 and a cavity 34 formed within the housing structure 30. A perforate surface 38 of the housing structure 30 is shaped to be inserted into an opening 40 formed in a water conducting cavity 12 of the marine propulsion device. A first water conduit 51 is connected in fluid communication with the cavity 34. A second water conduit 52 is connected in fluid communication with the cavity 34.

The perforate surface 38 comprises a plurality of holes 60, in which each of the plurality of holes 60 is smaller in dimension (e.g. diameter or area) than either the first, second, or third water conduits. The perforate surface 38 is curved to generally conform with an inner surface of the water conducting cavity. The housing structure 30 is shaped to dispose the perforate surface 38 in a non-protruding position in relation to a inner surface of the water conducting cavity 12 when the housing structure 30 is attached to a portion 64 of the marine propulsion device in which the water conducting cavity 12 is contained and the perforate surface 38 is disposed in fluid communication with the water conducting cavity 12. The first water conduit 51 is connectable to a fuel cooling system or a fuel supply module 71. The second water conduit 52 is connectable to a tell-tale system 72 which allows the operator of the marine vessel to visually monitor the proper operation of the cooling system. The third water conduit 53 is connectable in fluid communication with an exhaust cooling system 73. The perforate surface 38 is a curved surface having a radius of curvature R which is generally equal to a radius of curvature of an inside surface of the water conducting cavity 12 surrounding the perforate surface 38 when the present invention is inserted into the opening 40.

As a result of the structure of the present invention, the flow of water through the water conducting cavity 12 is generally unimpeded. The fact that the perforate surface does not significantly extend into the primary cooling passage of the water conducting cavity 12 allows the perforate surface to be self-cleaning in response to the water flowing through the water conducting cavity 12. Most of the main flow of water through the water conducting cavity 12 flows past, and not through, the holes of the perforate surface 38. The cavity 34 provides a manifold into which some of the water flows from the water conducting cavity 12 and from which water flows into a plurality of water conduits, such as those identified by reference numerals 51–53. The present invention makes it possible to use a single cavity 34 and a single perforate surface 38 to provide water to a plurality of auxiliary devices.

Although the present invention has been described with considerable detail and illustrated to show a preferred embodiment, it should be understood that alternative embodiments are also within its scope.

We claim:
1. A cooling water distribution system for a marine propulsion device, comprising:
   a housing structure;
   a cavity formed within said housing structure;
   a perforate surface of said housing structure, said perforate surface being shaped to be inserted into an opening formed in a water conducting cavity of said marine propulsion device, said perforate surface being curved to generally conform with an inner surface of said water conducting cavity;
   a first water conduit connected in fluid communication with said cavity;
   a second water conduit connected in fluid communication with said cavity; and
   a third water conduit connected in fluid communication with said cavity, said perforate surface comprising a plurality of holes, each of said plurality of holes being smaller in dimension than either of said first and second water conduits, said perforate surface being a curved surface having a radius of curvature which is generally equal to a radius of curvature of an inside surface of said water conducting cavity surrounding said perforate surface, said housing structure being shaped to dispose said perforate surface in a non protruding position in relation to an inner surface of said water conducting cavity when said housing structure is attached to a portion of said marine propulsion device in which said water conducting cavity is contained and said perforate surface is disposed in fluid communication with said water conducting cavity, said first water conduit being connectable to a fuel cooling system, said second water conduit being connectable to a tell-tale indicator system, said third water conduit being connectable to a tell-tale system.

* * * * *